Patented July 15, 1941

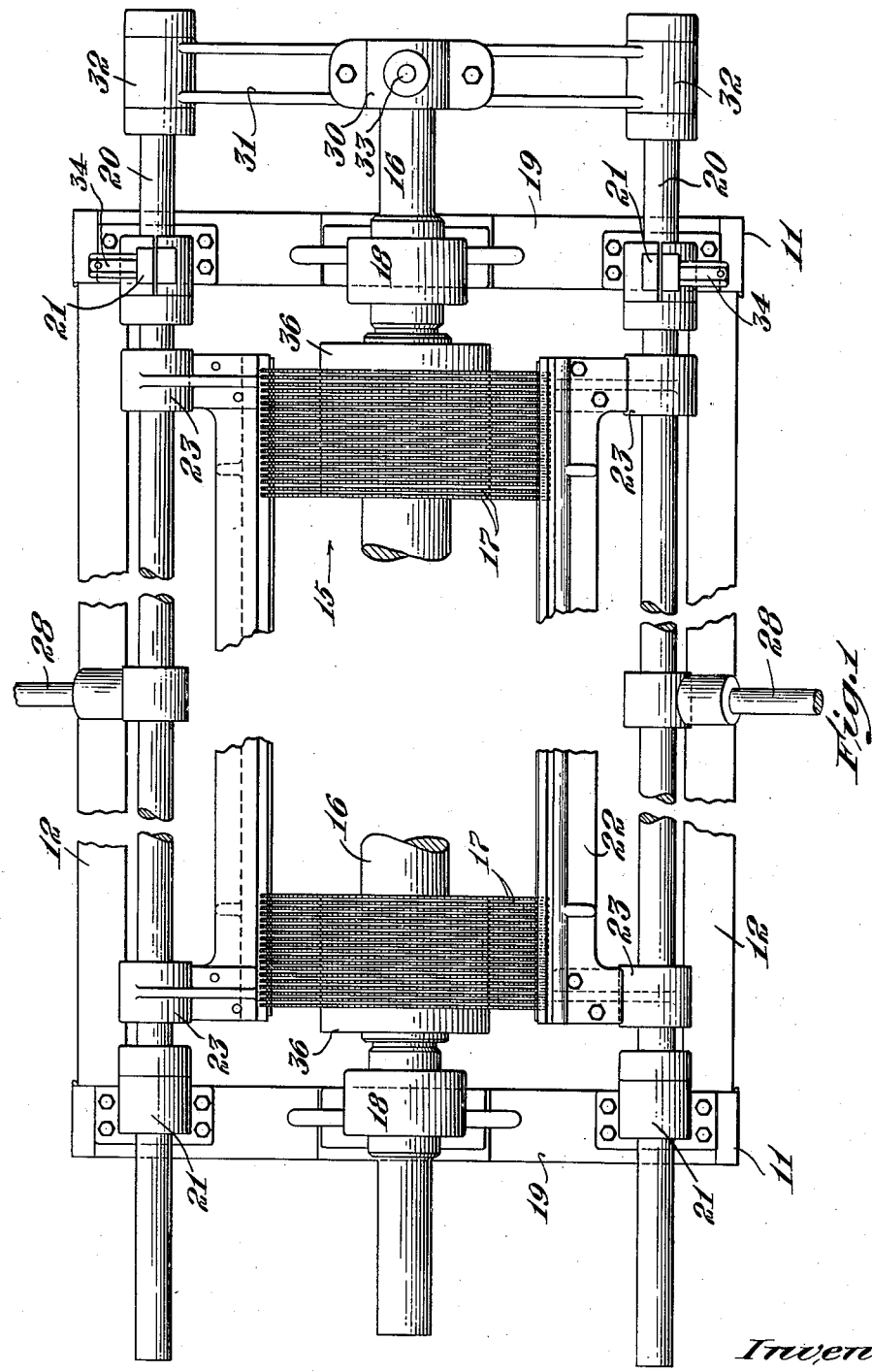

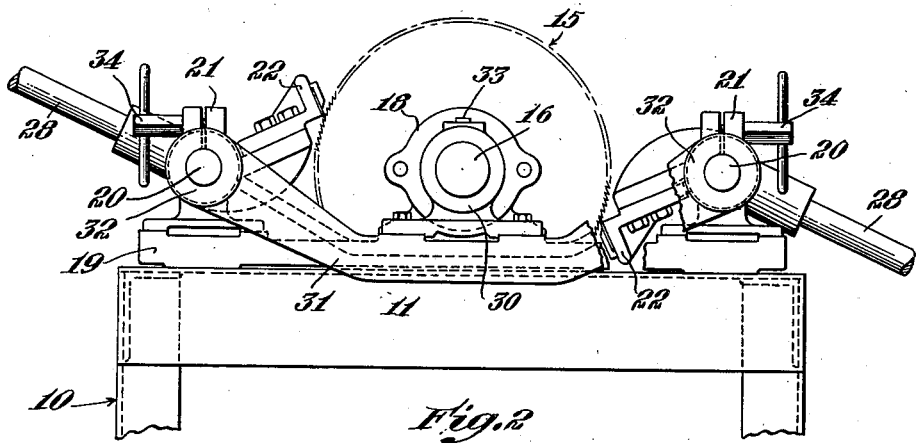
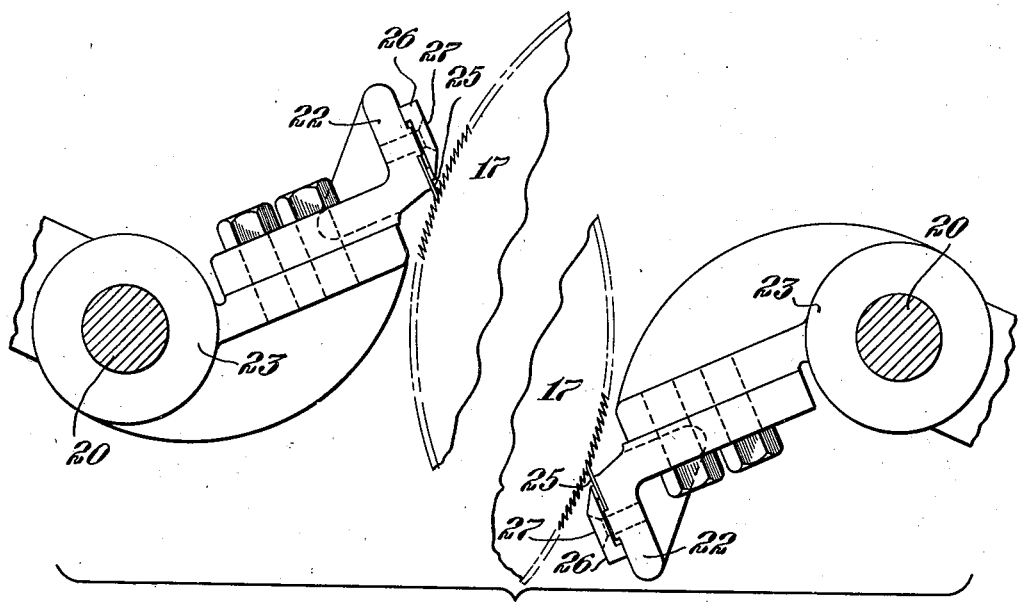
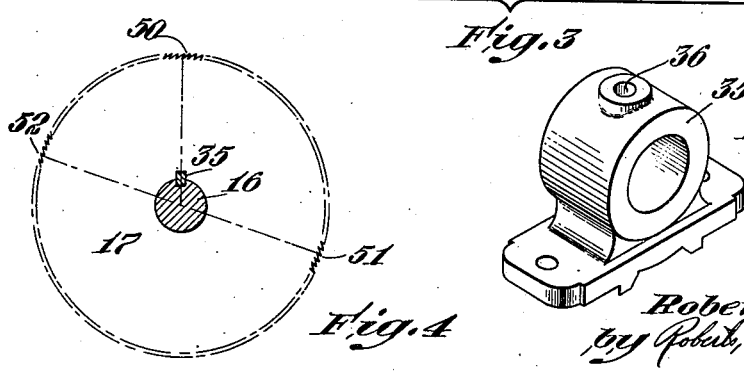
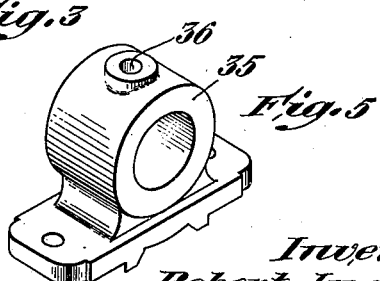

2,249,140

UNITED STATES PATENT OFFICE 2,249,140

ALIGNING MACHINE

Robert Inglee, Westdale, Mass., assignor to The Murray Company, Dallas, Tex., a corporation of Texas Application May 18, 1940, Serial No. 335,943

15 Claims. (Cl. 33—185)

This invention relates to an improvement in an aligning machine by which the teeth of a saw cylinder which comprises a plurality of saw disks mounted upon a common shaft or arbor, can be brought into substantial alignment as is hereinafter set forth and claimed.

The chief advantage of having the teeth of the disks of a saw cylinder in as accurate an alignment as possible is that thereby the operation of gumming and filing are facilitated and that the operation of the cylinder in ginning is in general improved.

If it were possible as a practical matter to make the saw disks of a cylinder identical with each other it would be very easy to align them. The fact is, however, that even though made under substantially identical conditions saw disks are not mathematically identical. The usual practice followed is to punch the teeth by means of a reciprocating punch, the disk being indexed after each punch so as to provide the periphery of the disk with the desired number of teeth.

The operation of the indexing mechanism may and almost invariably does embody some slight inaccuracy which results in an imperfect final tooth. Since each disk is to some extent under tension when the punching takes place it will after each tooth is punched react to various degrees and extent so that the teeth will vary in contour and inclination. Moreover the usual peening of the disk to flatten it, as well as the hardening or tempering thereof will tend to change the contour of the disk a trifle and also to throw the central opening out of round.

In addition the central openings of the disks through which the shaft or arbor passes are necessarily of a diameter slightly greater than the diameter of the shaft so that a certain bodily shifting of the disks relative to the shaft is possible. Consequently even though the disks be perfectly made this shifting will obviously impair the alignment of the teeth.

A machine embodying this invention is shown in the accompanying drawings wherein:

Fig. 1 is a plan view with parts broken away or omitted of such a machine;

Fig. 2 is an end view of such machine;

Fig. 3 is an end view on an enlarged scale illustrating portions of a disk and the aligning elements in engagement therewith;

Fig. 4 illustrates a disk on the shaft and indicates the location of the rows of teeth involved in carrying out this invention; and Fig. 5 illustrates a bracket by which the cylinder shaft is spotted.

The aligning machine includes a standard or table 10 having end rails 11 and side rails 12. A saw cylinder 15 comprising a shaft or arbor 16 and a plurality of toothed disks 17 is supported on the table, the shaft 16 being mounted for rotation in boxes 18 carried by bed plates 19 resting upon and bolted to the end rails 11. Shafts 20, parallel to the shaft 16 and at opposite sides of the cylinder 15, are carried in boxes 21 fixed to the plates 19.

Upon each shaft 20 is mounted an aligning element. Such element comprises a holder bar 22 carried at the ends by brackets 23 fixed upon the shaft 20. A straight edge 25 is fixed to the holder bar 22 by a clamp 26 secured to the bar 22 by screws 27. Each shaft 20 is provided with a handle 28 by which it may be oscillated to move the edges 25 into and out of engagement with the teeth of the saw cylinder. It will be noted as shown in Figs. 2 and 3 that the shafts 20 are arranged at diametrically opposite sides of the shaft 16 and that the straight edges 25 engage the teeth of the saw cylinder along diametrically opposite lines.

In order to hold the shaft 16 of the saw cylinder 15 against rotation there is provided a bracket 30 which receives one end of the shaft and is bolted to a yoke 31 having integral sleeves 32 which are slipped over the shafts 20. A set screw 33 through a passage in the bracket 30 is adapted to engage the shaft 16 and hold it in any desired position. In order to clamp the shafts 20 against rotation the boxes 21 on one bed plate 19 are in the form of split sleeves which are tightened by screws 34. The sleeves 32 may if desired be split and provided with clamping screws like the sleeves constituting the boxes 21.

The alignment of a saw cylinder with the machine just described may be carried on in the following manner. The saw cylinder 15 with the boxes 18 is mounted on the table 10, the boxes being bolted to the bed plates 19. A yoke 31 carrying a bracket 30 is hung on the shaft 16, 20. The shafts 20 are turned so that the straight edges 25 are out of contact with the saw cylinder.

The cylinder is first set with the spline 35 of the shaft 16 at the top and the sleeves 36 tightened to clamp the disks 17 against each other to such an amount that they are movable but not freely.

The operator first adjusts the saw disks until the uppermost tooth of each of the several disks is in general alignment with the corresponding teeth of the other disks. This is done by rotating individually such disks as are necessary by the use of pliers or other suitable means bringing them into contact with the spline 35 of the shaft to take up any lost motion.

The cylinder is then rotated until the spline is about in line with the straight edge 25 carried by the shaft 20 at the right of the cylinder in Fig. 2. The row of teeth aligned as stated above, is now in such position that, upon rotating such shaft the straight edge 25 carried thereby enters a valley at one side of the said row of teeth. Since as shown particularly on Fig. 3 the straight edge 25 approaches the cylinder along a line similar to the contour of the teeth, that edge will enter a valley between two rows of teeth. The shaft 20 is thereupon clamped in position. The other shaft 20 is then rotated to swing its straight edge 25 downwardly toward the cylinder. The straight edges of these shafts are so positioned that they engage the cylinder along diametrically opposite lines and the second straight edge accordingly enters a valley between rows of teeth 180° away from that engaged by the first straight edge. The shaft 20 carrying said second straight edge is then clamped against rotation by its set screw 34. Due to the variance in structure and mountings of the disks it must follow that the row of teeth at the second straight edge 25 are not entirely in alignment. This condition is corrected by swinging the disks individually relative to the shaft upon the first straight edge as a fulcrum, the second straight edge acting to limit such swinging.

In order to prepare the cylinder most efficiently for treatment by a gumming apparatus, such for example as that shown in the McLean Patent No. 1,994,077, dated March 12, 1935, the bracket 30 may be removed and a bracket 35 substituted therefor. The bracket 35 has a drill bushing 36 therein through which a drill (not shown) may be inserted to indent or "spot" the shaft 16. The bracket 30 is now restored and the shaft clamped against rotation by the set screw 33 therein while the disks are being clamped tightly. The "spot" on the shaft 16 is so placed that the teeth of the gear of the gumming machine will always bear the same relation to the teeth of the saw which is necessary since the gumming machine is always positively indexed. Obviously when a cylinder so prepared is provided with new disks, the spot will be used to locate the shaft and insure that the alignment of the saw teeth will be the same as that of the cylinder when first prepared.

The essence of this invention is the aligning of the teeth of a saw cylinder wherein at least two separated rows of teeth, here shown as diametrically spaced, are aligned and any inaccuracies inherent in the disks of the cylinder are distributed along the periphery of the cylinder. The alignment of the teeth is illustrated diagrammatically in Fig. 4 wherein 50 indicates the first position of the row of teeth preliminarily aligned, 51 indicates the second position of such row, and 52 indicates the row of teeth diametrically opposite the first row which are in turn aligned.

While one embodiment of the invention has been shown and described, it will be understood that it is not limited thereto and that other embodiments of the invention may be made without departing from the spirit and scope thereof as set forth in the following claims.

I claim:

1. Method of aligning the teeth of a saw cylinder having a plurality of peripherally toothed disks comprising the steps of aligning one row of teeth and while maintaining such teeth in alignment, aligning another row of teeth spaced circumferentially of the first row, and clamping the disks against relative movement.

2. Method of aligning the teeth of a saw cylinder having a plurality of peripherally toothed disks comprising the steps of aligning one row of teeth and while maintaining such teeth in alignment, aligning the row of teeth diametrically opposite the first row of teeth, and clamping the disks against relative movement.

3. Method of aligning the teeth of a saw cylinder comprising a plurality of peripherally toothed disks and a shaft on which said disks are supported comprising the steps of holding said shaft against rotation, aligning a row of teeth of the cylinder, rotating said cylinder through a portion of its circumference and aligning a second row of teeth while maintaining the first row in alignment, and clamping the disks against relative movement.

4. Method of aligning the teeth of a saw cylinder comprising a plurality of peripherally toothed disks and a shaft on which said disks are supported comprising the steps of holding said shaft against rotation, aligning a row of teeth of the cylinder, rotating said cylinder through a portion of its circumference and aligning the row of teeth diametrically opposite the first row while maintaining said first row in alignment, and clamping the disks against relative movement.

5. A machine for aligning the teeth of a saw cylinder comprising means for supporting said cylinder in position for free rotation, means for securing said cylinder against rotation to permit the alignment of one row of teeth thereof, means toward which said cylinder is rotated, which means act to engage said row of teeth and maintain it in alignment, and means for engaging a second row of teeth spaced circumferentially from the first row, said engaging means coacting to hold the cylinder against rotation and to assist the alignment of the second row of teeth.

6. A machine for aligning the teeth of a saw cylinder comprising means for supporting said cylinder in position for free rotation, means for securing said cylinder against rotation to permit the alignment of one row of teeth thereof, means toward which said cylinder is rotated, which means act to engage said row of teeth and maintain it in alignment, and means for engaging a second row of teeth spaced circumferentially from the first row, said first engaging means acting to hold the cylinder against rotation and to serve as a fulcrum whereby the second row of teeth is aligned with respect to said second engaging means.

7. A machine for aligning the teeth of a saw cylinder comprising means for supporting said cylinder in position for free rotation, means for securing said cylinder against rotation to permit the alignment of one row of teeth thereof, means toward which said cylinder is rotated, which means act to engage said row of teeth and maintain it in alignment, and means for engaging a second row of teeth spaced circumferentially from the first row, said first engaging means acting to hold the cylinder against rotation and to serve as a fulcrum about which the disks of the cylinder may be swung and said second engaging means limiting the swinging of said disks whereby the second row of teeth is aligned.

8. A machine for aligning the teeth of a saw cylinder comprising means for supporting said cylinder in position for free rotation, means for securing said cylinder against rotation to permit the alignment of one row of teeth thereof, means toward which said cylinder is rotated, which means act to engage said row of teeth and maintain it in alignment, and means for engaging a second row of teeth spaced circumferentially from the first row, each said engaging means including a straight edge which enters a valley of the cylinder and engages a row of teeth.

9. A machine for aligning the teeth of a saw cylinder comprising means for supporting said cylinder in position for free rotation, means for securing said cylinder against rotation to permit the alignment of one row of teeth thereof, means toward which said cylinder is rotated, which means act to engage said row of teeth and maintain it in alignment, and means for engaging a second row of teeth spaced circumferentially from the first row, each said engaging means including a straight edge which enters a valley of the cylinder and engages a row of teeth and is so located that the valleys entered by the straight edges are diametrically opposite each other.

10. A machine for aligning the teeth of a saw cylinder comprising means for supporting said cylinder in position for free rotation, means for securing said cylinder against rotation to permit the alignment of one row of teeth thereof, means toward which said cylinder is rotated, which means act to engage said row of teeth and maintain it in alignment, and means for engaging a second row of teeth spaced circumferentially from the first row, each said engaging means including a rotatably supported shaft and a straight edge carried thereby, said shafts and straight edges being parallel and mounted at opposite sides of the cylinder.

11. A machine for aligning the teeth of a saw cylinder comprising means for supporting said cylinder in position for free rotation, means for securing said cylinder against rotation to permit the alignment of one row of teeth thereof, means toward which said cylinder is rotated, which means act to engage said row of teeth and maintain it in alignment and means for engaging a second row of teeth spaced circumferentially from the first row, each said engaging means including a rotatably supported shaft, means for holding said shaft against rotation and a straight edge carried by the shaft, said shafts and straight edges being parallel to and mounted at opposite sides of the cylinder, and means for rotating said shafts to move the straight edges relative to said cylinder.

12. A machine of the class described, comprising means for supporting a saw cylinder shaft during alignment of the saw blades, means engageable with corresponding teeth of the several saw blades at two peripherally spaced points, thereby to align the teeth so engaged, and means for marking the saw shaft at a point in its circumference definitely located with respect to the two sets of aligned teeth.

13. A machine of the class described, comprising means for supporting a saw cylinder shaft having a series of saw blades loosely mounted thereon, and having means for clamping the blades in a fixed position on the shaft, a tooth aligning element having a straight edge parallel to the axis of the shaft and engageable by corresponding teeth of the several blades, a saw tooth aligning element spaced peripherally of the cylinder from the first aligning element and also comprising a straight edge engageable with corresponding teeth of the several saws, means for moving said aligning elements toward and from operative position and means for temporarily fixing them in operative position.

14. A machine of the class described, comprising means for supporting a saw cylinder shaft having a series of saw blades loosely mounted thereon, and having means for clamping the blades in fixed position on the shaft, and a plurality of aligning elements engageable with corresponding teeth of the several saws thereby to position the engaged teeth in alignment with each other, said aligning elements being spaced peripherally of the cylinder.

15. A machine of the class described, comprising means for supporting a saw cylinder shaft having a series of saw blades loosely mounted thereon, and having means for clamping the blades in fixed position on the shaft, means operative by engagement with teeth of the several saw blades to align corresponding teeth of the several blades at least at two peripherally spaced points.

ROBERT INGLEE.